United States Patent
Bezbaruah et al.

(10) Patent No.: US 8,341,177 B1
(45) Date of Patent: Dec. 25, 2012

(54) AUTOMATED DEREFERENCING OF ELECTRONIC COMMUNICATIONS FOR ARCHIVAL

(75) Inventors: Angshuman Bezbaruah, Pune (IN); Ankur P. Panchbudhe, Pune (IN)

(73) Assignee: Symantec Operating Corporation, Mountain View, CA (US)

(*) Notice: Subject to any disclaimer, the term of this patent is extended or adjusted under 35 U.S.C. 154(b) by 1274 days.

(21) Appl. No.: 11/647,052

(22) Filed: Dec. 28, 2006

(51) Int. Cl.
*G06F 17/30* (2006.01)

(52) U.S. Cl. .......... 707/769; 707/770; 707/782

(58) Field of Classification Search .......... 707/795, 707/694, 999.001, 999.01, 999.107, 673, 707/705, 706, 770, 782, 769; 709/206
See application file for complete search history.

(56) References Cited

U.S. PATENT DOCUMENTS

| | | | |
|---|---|---|---|
| 5,790,793 A * | 8/1998 | Higley | 709/218 |
| 5,890,163 A * | 3/1999 | Todd | 1/1 |
| 6,253,204 B1 * | 6/2001 | Glass et al. | 1/1 |
| 6,275,848 B1 * | 8/2001 | Arnold | 709/206 |
| 6,321,242 B1 * | 11/2001 | Fogg et al. | 715/236 |
| 6,484,247 B1 * | 11/2002 | Gendron et al. | 711/170 |
| 6,578,078 B1 * | 6/2003 | Smith et al. | 709/224 |
| 6,606,653 B1 * | 8/2003 | Ackermann et al. | 709/219 |
| 6,772,208 B1 * | 8/2004 | Dutta | 709/225 |
| 6,904,435 B2 * | 6/2005 | Jenkins et al. | 1/1 |
| 7,054,905 B1 * | 5/2006 | Hanna et al. | 709/206 |
| 7,113,948 B2 * | 9/2006 | Jhingan et al. | 1/1 |
| 7,155,481 B2 * | 12/2006 | Prahlad et al. | 709/206 |
| 7,251,680 B2 * | 7/2007 | DeVos | 709/206 |
| 7,260,600 B1 * | 8/2007 | Dunn et al. | 709/203 |
| 7,315,861 B2 * | 1/2008 | Seibel et al. | 1/1 |
| 7,376,702 B2 * | 5/2008 | DeSalvo et al. | 709/206 |
| 7,412,489 B2 * | 8/2008 | Nowacki et al. | 709/206 |
| 7,464,326 B2 * | 12/2008 | Kawai et al. | 715/205 |
| 7,519,679 B2 * | 4/2009 | Kale et al. | 709/217 |
| 7,587,398 B1 * | 9/2009 | Fredricksen et al. | 1/1 |
| 7,689,667 B2 * | 3/2010 | Lal | 709/218 |
| 7,730,148 B1 * | 6/2010 | Mace et al. | 709/206 |
| 2001/0007105 A1 * | 7/2001 | Brotz et al. | 707/1 |
| 2002/0059384 A1 * | 5/2002 | Kaars | 709/206 |
| 2002/0078087 A1 * | 6/2002 | Stone | 707/511 |
| 2002/0087559 A1 * | 7/2002 | Pratt | 707/100 |
| 2002/0122543 A1 | 9/2002 | Rowen | |
| 2002/0123980 A1 | 9/2002 | Jenkins et al. | |
| 2002/0129108 A1 | 9/2002 | Sykes, Jr. | |
| 2003/0041112 A1 * | 2/2003 | Tada et al. | 709/206 |
| 2003/0084095 A1 * | 5/2003 | Hayden | 709/203 |
| 2003/0158953 A1 * | 8/2003 | Lal | 709/230 |
| 2003/0208608 A1 * | 11/2003 | Merriam | 709/229 |
| 2004/0078224 A1 * | 4/2004 | Schramm-Apple et al. | 705/2 |
| 2004/0083424 A1 * | 4/2004 | Kawai et al. | 715/501.1 |
| 2004/0088351 A1 * | 5/2004 | Liu et al. | 709/203 |
| 2004/0205569 A1 * | 10/2004 | McCarty et al. | 715/513 |
| 2004/0221048 A1 | 11/2004 | Ogier | |
| 2004/0221295 A1 * | 11/2004 | Kawai et al. | 719/313 |
| 2005/0120060 A1 * | 6/2005 | Meng | 707/202 |
| 2005/0203909 A1 * | 9/2005 | Zhao | 707/10 |
| 2006/0010322 A1 * | 1/2006 | Novack et al. | 713/170 |
| 2006/0031309 A1 * | 2/2006 | Luoffo et al. | 709/206 |

(Continued)

*Primary Examiner* — Thanh-Ha Dang
(74) *Attorney, Agent, or Firm* — Campbell Stephenson LLP

(57) ABSTRACT

Various methods and systems for automatically obtaining documents that are referenced by an electronic communication, such as an email or instant message, for archival are disclosed. One method involves searching at least a portion (e.g., the header and/or body) of an electronic communication for a reference to a document and, in response to detecting the reference, automatically obtaining an electronic copy of the document. The electronic copy of the document can then be archived.

20 Claims, 4 Drawing Sheets

U.S. PATENT DOCUMENTS

| | | |
|---|---|---|
| 2006/0095528 A1 | 5/2006 | Sykes, Jr. |
| 2007/0067399 A1* | 3/2007 | Kulkarni et al. .............. 709/206 |
| 2007/0101061 A1* | 5/2007 | Baskaran et al. ............. 711/118 |
| 2007/0112792 A1* | 5/2007 | Majumder ................... 707/100 |
| 2007/0113035 A1* | 5/2007 | DeVos .......................... 711/162 |
| 2007/0168435 A1* | 7/2007 | Moraca et al. ................ 709/206 |
| 2008/0005081 A1* | 1/2008 | Green et al. ...................... 707/3 |
| 2008/0235760 A1* | 9/2008 | Broussard et al. ................ 726/1 |

\* cited by examiner

AUTOMATED DEREFERENCING OF ELECTRONIC COMMUNICATIONS FOR ARCHIVAL

FIELD OF THE INVENTION

This invention relates to managing data and, more particularly, to archiving electronic communications.

DESCRIPTION OF THE RELATED ART

Innovations such as email and instant messaging have changed the way people communicate. These forms of electronic communication allow people to quickly and easily convey information to each other. For example, one employee can draft an electronic document and store that document on a server that is accessible to other employees, allowing the other employees to access the document at their convenience, without having to obtain a physical copy of the document. As another example, people can easily send and receive'text messages or emails.

As people increase their usage of electronic forms of communication, however, new problems have begun to arise. One such problem is the management of the electronic communications themselves. For example, many corporations archive the emails sent by and received from employees. One purpose of archiving is to preserve the content of each electronic communication at the time each communication was sent and/or received. Typical archival systems archive the emails and, possibly, attachments to those emails. However, many emails contain references to other documents (e.g., using hyperlinks) without actually including those documents as attachments. Thus, the referenced documents will not be saved by the archival system. If an archived email containing a reference to, for example, a web site, is later accessed via the archival system, the web site may no longer be available or may have been updated subsequent to the sending of the email. Accordingly, there may not be a way to obtain a copy of the referenced web site as the web site existed at the time the archived email was sent. As this example shows, new techniques for handling archived communications that refer to other documents are desirable.

SUMMARY

Various embodiments of methods and systems for automatically obtaining documents that are referenced by an electronic communication, such as an email or instant message, for archival are disclosed. In one embodiment, a method involves searching at least a portion (e.g., the header and/or body) of an electronic communication for a reference to a document and, in response to detecting the reference, automatically obtaining an electronic copy of the document. The electronic copy of the document can then be archived.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
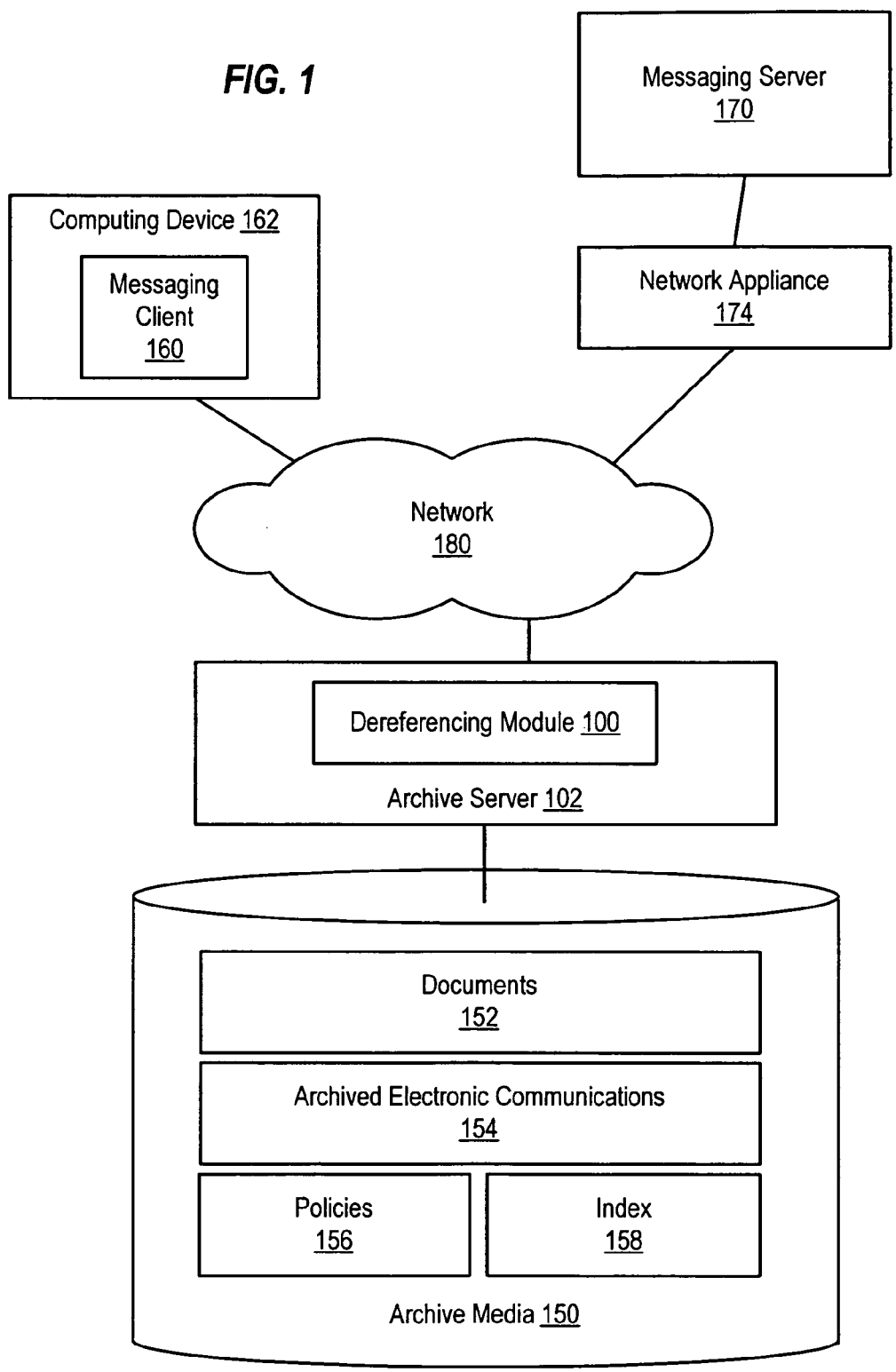
FIG. 1 is a block diagram of a system that archives electronic communications, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system that archives electronic documents. In this example, a dereferencing module 100 is implemented as part of an archive server 102. Archive server 102 is configured to archive electronic communications by storing archival copies (archived electronic communications 154) of those electronic communications on archive media 150. Archive media 150 can include one or more tapes, hard drives, compact discs (CDs) or digital video discs (DVDs), storage appliances such as EMC Centera™ from EMC Corporation and NetApp SnapLock™ from Network Appliance, Inc., and the like, as well as one or more arrays of individual storage devices (e.g., an optical storage jukebox, a "Just a Bunch of Disks" (JBOD) array, or a Redundant Array of Independent Disks (RAID) system).

Dereferencing module 100 is configured to "dereference" electronic communications. Dereferencing module 100 dereferences an electronic communication by searching for references to other documents within the electronic communication and then obtaining copies of the referenced documents, if any. A reference can include a Uniform Resource Locator (URL) (e.g., "http://" followed by "www.symantec.com") or other Uniform Resource Identifier (URI). A reference can also include a file system path name (e.g., "C://WINNT/system32/" or "\\host123\folder1\file1.pdf").

Dereferencing module 100 identifies references within an electronic communication by searching all or part (e.g., the body and/or header) of the electronic communication for references. Once dereferencing module 100 has identified all references within an electronic communication, dereferencing module 100 attempts to obtain copies of the referenced documents (if any) using the reference (e.g., if the reference is a URL, a web crawler embedded within dereferencing module 100 can attempt to obtain a copy of the document identified by the URL). Archive server 102 can the store archival copies of the documents 152 obtained by dereferencing module 100 on archive media 150.

In some embodiments, only certain electronic communications are archived and/or de-referenced. In such embodiments, archive server 102 uses policies 156 to determine which electronic communications to archive and/or dereference. Also, archive server 102 can maintain an index 158, which is used to search archived electronic communications 154 and/or documents 152.

In this example, archive server 102 archives electronic communications sent from and/or received by messaging client 160, which is implemented on computing device 162. Messaging client 160 is a client of messaging server 170. Messaging client 160 can be an email client, an instant messaging client, a text messaging client (e.g., using Short Messaging Service (SMS), Multimedia Messaging Server (MMS), or the like), BlackBerry™ client, electronic bulletin board client, news feed client, or any other type of electronic messaging client. Additionally, in some embodiments, messaging client 160 may, implement a facsimile recipient.

Computing device 160, messaging server 170, and archive server 102 are coupled by network 180. Network 180 can include one or more of a local area network (LAN) and a wide area network (WAN) such as the Internet. Network 180 can be implemented using a variety of different topologies and media, including electrical, optical, and/or wireless links.

In some embodiments, a network appliance 174 is coupled to one of the other components of the system shown in FIG. 1. In this example, network appliance 174 is interposed between network 180 and messaging server 170. Network appliance 174 can intercept electronic communications being conveyed to messaging server 170 and perform various operations (e.g., junk mail filtering, virus scanning, and the like) on the intercepted electronic communications.

Policies 156 can identify which electronic communications should be archived. If an electronic communication is not being archived, there is no need to dereference that electronic communication. Furthermore, it may be desirable to archive but not dereference certain electronic communications. Thus, in addition to identifying which electronic communications should be archived, policies 156 can identify which electronic communications should be dereferenced.

Some policies can also be applied after dereferencing and before archiving. For example, one policy can specify that a document obtained by dereferencing should not be archived if the dereferenced document contains a copyright notice.

In the illustrated system, when an electronic communication is sent to the user of messaging client 160, the electronic communication is initially sent to messaging server 170 via network appliance 174. The user can access the electronic communication via messaging client 160. At this point both the messaging server and the messaging client can have a copy of the electronic communication.

Archive server 102 can obtain a copy of the electronic communication in a variety of different ways. In one embodiment, archive server 102 accesses an application programming interface (API) provided by messaging server 170 to obtain a copy of the electronic communication. Archive server 102 can routinely (e.g., at prespecified intervals) poll messaging server 170 in order to obtain copies of new electronic communications received by messaging server 170 subsequent to the last time archive server 102 polled the messaging server.

Alternatively, archive server 102 can obtain a copy of an electronic communication by interacting with messaging client 160. For example, messaging client 160 can be configured to forward all or some electronic communications to archive server 100. Alternatively, messaging client 160 can present an API that allows archive server 100 to request electronic communications.

In yet another embodiment, all or some of the data stored by computing device 160 is regularly backed up, and archive server can obtain copies of electronic communications received by messaging client 160 from a backup of the data stored by computing device 160. For example, the user of computing device 160 may create a backup of one or more emails in a personal folder (PST) file. Archive server 102 can access the PST file and extract the electronic communication from that PST file.

In the system illustrated in FIG. 1, dereferencing module 100 processes each electronic communication that is received by archive server 102. Dereferencing module 100 can process electronic communications before, during, or after archival of the electronic communication.

While dereferencing module 100 is shown as part of archive server 102 in the illustrated example, it is noted that dereferencing module 100 can alternatively be implemented within any of a variety of different system components. For example, dereferencing module 100 can be implemented as part of network appliance 174, messaging server 180, or messaging client 160. In situations in which dereferencing module 100 is not part of archive server 102, archive server 102 can, in some embodiments, obtain the documents from the component that includes dereferencing module 100 (either dereferencing module 100 can send the documents to archive server 102 as the documents are obtained or archive server 102 can routinely poll dereferencing module 100 for the documents). In other embodiments, dereferencing module 100 modifies the electronic communications to include the referenced documents (e.g., by incorporating the referenced documents into an unused field within each electronic communication), allowing archive server 102 to obtain the referenced documents along with the electronic communications themselves.

In one alternative embodiment, dereferencing module 100 is part of network appliance 174. In this embodiment, dereferencing module 100 can dereference electronic communications being sent to and/or from messaging server 170. If it is desired to selectively dereference the electronic communications, dereferencing module 100 can maintain its own policies (e.g., in an administrator-provided configuration file). Dereferencing module 100 can either incorporate the documents obtained by dereferencing into the electronic communications themselves (such that the modified electronic communications will be provided to messaging server 170 and then ultimately to archive server 102), store the documents locally (to be provided to archive server 102 when the archive server requests them), or provide the documents directly to the archive server. If the documents are stored or provided to the archive server directly, information identifying the electronic communication that referenced the documents can also be stored or provided in order to allow each document to be correlated with a referencing electronic communication.

In one embodiment, archive server 102 is implemented using Enterprise Vault™ and/or IM Manager™, available from Symantec Corp. of Cupertino, Calif. As already noted above, archive server 102 can be implemented separately from (e.g., on a different computing device than and/or as part of a different application than) dereferencing module 100 in some embodiments. Additionally, in alternative embodiments, archive server 102 can be integrated with various other system components such as network appliance 174, messaging server 170, and messaging client 160.

Figure 2:
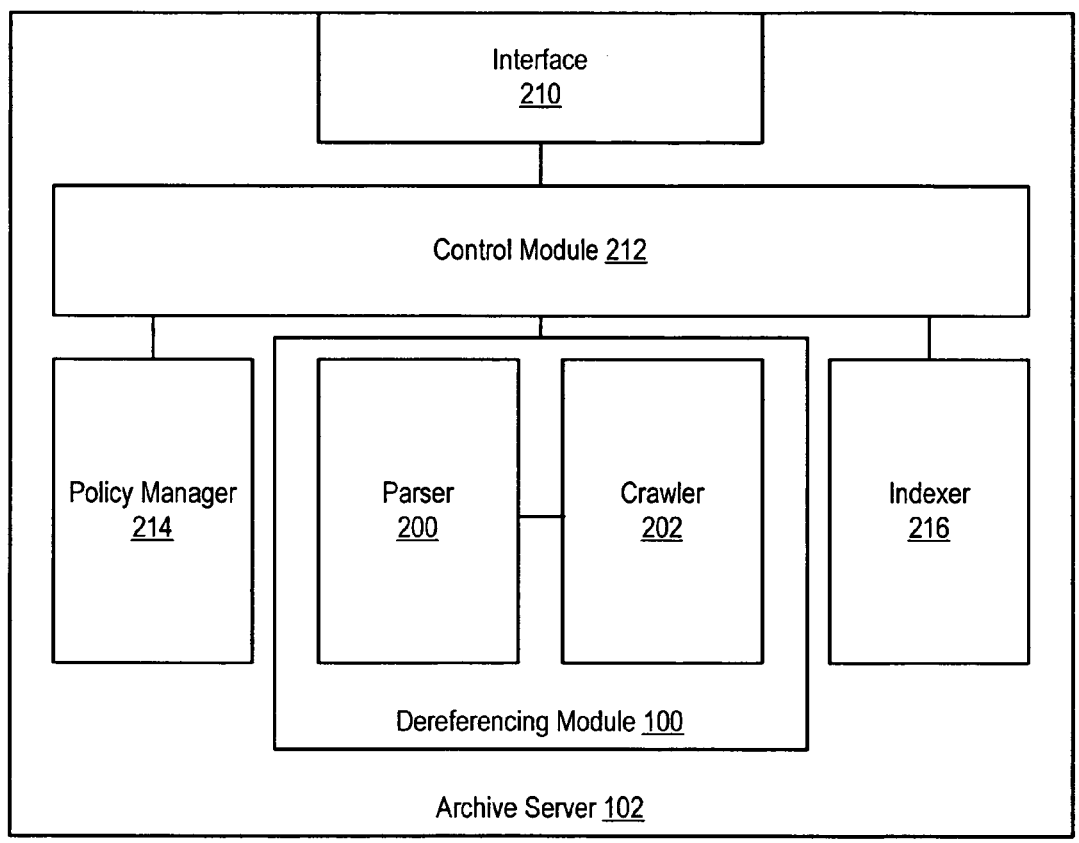
FIG. 2 is a block diagram of an archive server that includes a dereferencing module, according to one embodiment of the present invention.

FIG. 2 is a block diagram of an archive server that includes a dereferencing module 100. Archive server 102 can be implemented as software, hardware, or a combination of both. Archive server 102 can be implemented independently or as part of a messaging server, network appliance, or messaging client. As shown, archive server 102 includes dereferencing module 100, which in turn includes a parser 200 and a crawler 202. Archive server 102 also includes an interface 210, a control module 212, a policy manager 214, and an indexer 216.

Interface 210 is configured to obtain electronic communications. For example, interface 210 can obtain electronic communications by polling a messaging server for new electronic communications, extracting backed-up electronic communications from a backup, intercepting electronic communications being sent to a messaging server, or performing any other technique to obtain a desired set of electronic communications.

Control module 212 controls each of the other components of archive server 102 (e.g., by controlling when the other components perform various operations on electronic communications and/or how the other components interact with each other). Control module 212 can, in some embodiments, implement a user interface that allows an archive administrator or user to input and view archival policies, perform searches on archived electronic communications, view search results, and/or configure the behavior of archive server 102.

Policy manager 214 is configured to apply policies to new electronic communications and, based on the application of the policies, determine whether a given electronic communication should be archived. Policy manager 214 can access a file, database, or other collection of information that identifies the policies used to determine which electronic communications should be archived and/or dereferenced as well as which documents (obtained by dereferencing an electronic communication) should be archived.

Indexer 216 is configured to generate a search index based upon archived electronic communications as well as archived documents obtained by dereferencing electronic communications. This search index can be used to expedite the performance of user searches for particular information in the archive maintained by archive server 102.

After a decision is made to dereference an electronic communication (e.g., based upon policies, as determined by policy manager 214), the communication can be provided to dereferencing module 100. As noted above, dereferencing module 100 includes parser 200 and crawler 202. When a communication is provided to dereferencing module 100, parser 200 parses the communication's header and/or body to identify the references, if any, within the electronic communication.

Parser 200 identifies references within an electronic communication by searching all or part (e.g., the body and/or header) of the electronic communication for references. For example, parser 200 can use regular expressions (or other searching techniques that use wildcards) to search for common elements of URLs (e.g., "http://" any text), network paths (e.g., any text "://" any text), and email addresses (e.g., any text "@" any text "." any text).

Crawler 202 is configured to obtain documents identified by references found by parser 200. Crawler 202 can include a web crawler for accessing documents identified by URLs. Various types of documents can be referenced within an electronic communication, including web pages, portable document format (PDF) documents, spreadsheets (e.g., Excel™ spreadsheet (XLS) files), word processing documents (e.g., Word™ document (DOC) files, text (TXT) files, Word Perfect™ files (WPF), and the like), and the like. If the document is a web page (e.g., a hypertext markup language (HTML) or extensible markup language (XML) file), both the web page itself and any embedded files (audio files, graphics files, video files, or the like) can be obtained.

Policy manager 214 can determine which electronic communications should be provided to dereferencing module 100 based upon policies (e.g., policies 156 of FIG. 1) that control the operation of archive server 102. Additionally, dereferencing module 100 can control which documents, identified by references found by parser 200, are actually obtained by crawler 202 based upon the policies. The policies can identify electronic communications to archive and/or dereference based upon criteria such as sender; receiver, subject, content, size, date, and the like. For example, the policies can indicate that all electronic communications to or from a particular corporate executive or legal officer should be both archived and dereferenced. Similarly, the policies can indicate that all electronic communications containing a particular keyword in a header (e.g., such as an email or instant message subject line) should be archived and dereferenced.

In some embodiments, the policies also specify the types of documents (e.g., based on file type) to actually archive, and thus only some of the references identified within an electronic communication may actually be obtained by crawler 202 and/or archived by archive server 102. Dereferencing module 100 and/or policy manager 214 can access the policies and selectively control which documents (identified by parser 200) are obtained by crawler 202 and/or archived by archive server 102.

The policies can identify documents to archive based upon various characteristics, such as file type. Some of these characteristics may not be identifiable until crawler 202 has actually obtained, or at least attempted to obtain, the document, while other characteristics can be identified based on the reference that identifies the document. Examples of characteristics include the Multipurpose Internet Mail Extensions (MIME) type of the referenced document, the size of the referenced document, whether the reference identifies a site within an intranet (as opposed to identifying a site accessible via an external network). For example, one policy can specify that only documents available from the corporate intranet should be archived. Accordingly, if a reference identifies a document that is external to the corporate intranet, dereferencing module 100 will not cause crawler 202 to obtain that document.

If a decision is made to archive a document referenced by the electronic communication, crawler 202 will obtain a copy of that document (e.g., for storage on archive media 150 by archive server 102, as shown in FIG. 1). If the reference points to a document (e.g., a Word™ file), the whole document will be archived. If the reference points to a web page, only the first page (i.e., the web page identified by the reference, as opposed to any related web pages linked to by the identified web page) will be obtained and archived.

If obtaining a copy of a referenced document requires access credentials (e.g., a log-on name and/or password), crawler 202 can prompt the user (e.g. using email, pop-ups etc.) for the credentials, which crawler 202 can use to obtain a copy of and/or access the document. If the credentials are needed to open the document (e.g., if the document is password protected), crawler 202 can cause the credentials to be archived along with the document. In some embodiments, crawler 202 is preconfigured (e.g., by an administrator) to access any web sites and/or documents maintained on the intranet of the entity operating archive server 102.

In some embodiments, whenever dereferencing module 100 obtains one or more documents that are referenced in an electronic communication, dereferencing module 100 modifies the electronic communication to refer to the documents. This allows the documents to be correlated with the electronic communication after both are archived. For example, if the electronic communication is an email, the email can be modified to contain a pointer to the storage location (within the archive media used to store the archived emails and documents) storing the document(s) referenced by the email.

In some situations, a document obtained by crawler 202 may itself contain references to other documents, creating a hierarchy of references. For purposes of this discussion, the references within the electronic communication itself are referred to as first level references. References within a first-level reference are referred to as second-level references, and so on.

Dereferencing module 100 can, in at least some embodiments, be configured to dereference documents obtained by dereferencing an electronic communication. For example, each time crawler 202 obtains a copy of a referenced document, dereferencing module 100 can provide that document to parser 200. If parser 200 finds any references within the document, dereferencing module 100 can provide those references to crawler 202, causing crawler 202 to obtain copies of the referenced documents. The number of levels of dereferencing to perform (and which communications and/or documents to perform the specified number of levels of dereferencing for) can be specified in the policies.

Once crawler 202 has obtained a copy of a document identified by a particular reference, crawler 202 can store information (e.g., the reference) in a table or database (or other appropriate storage structure) maintained by crawler 202. Before attempting to obtain a document based on a reference, crawler 202 can search this information to make sure that the document has not already been obtained. This can prevent unnecessary document downloads, especially in situations in which many electronic communications contain the same reference (e.g., as occurs when one email is forwarded to many people within the same organization, such that multiple copies of the email, each containing the same reference, may be provided to archive server 102).

When archive server 102 archives documents (e.g., by storing those documents to a backup), archive server 102 can use single-instancing techniques to ensure that multiple copies of the same document are not stored. For example, each time a document is to be archived, archive server 102 can apply a hash function to the document (or a portion of the document). If the resulting hash value matches the hash value calculated for an existing document within the archive, archive server 102 determines that a copy of the document has already been stored.

In another embodiment, archive server 102 can simply search for the document's file name within the archive to determine whether the document has already been archived. In this embodiment, archive server 102 can compare information such as file size, creation date, and modification date to make sure that the document has not been modified subsequent to initially being archived. If the document has been modified, archive server 102 can store the new copy of the document, despite a version of that document having already been archived.

Figure 3:
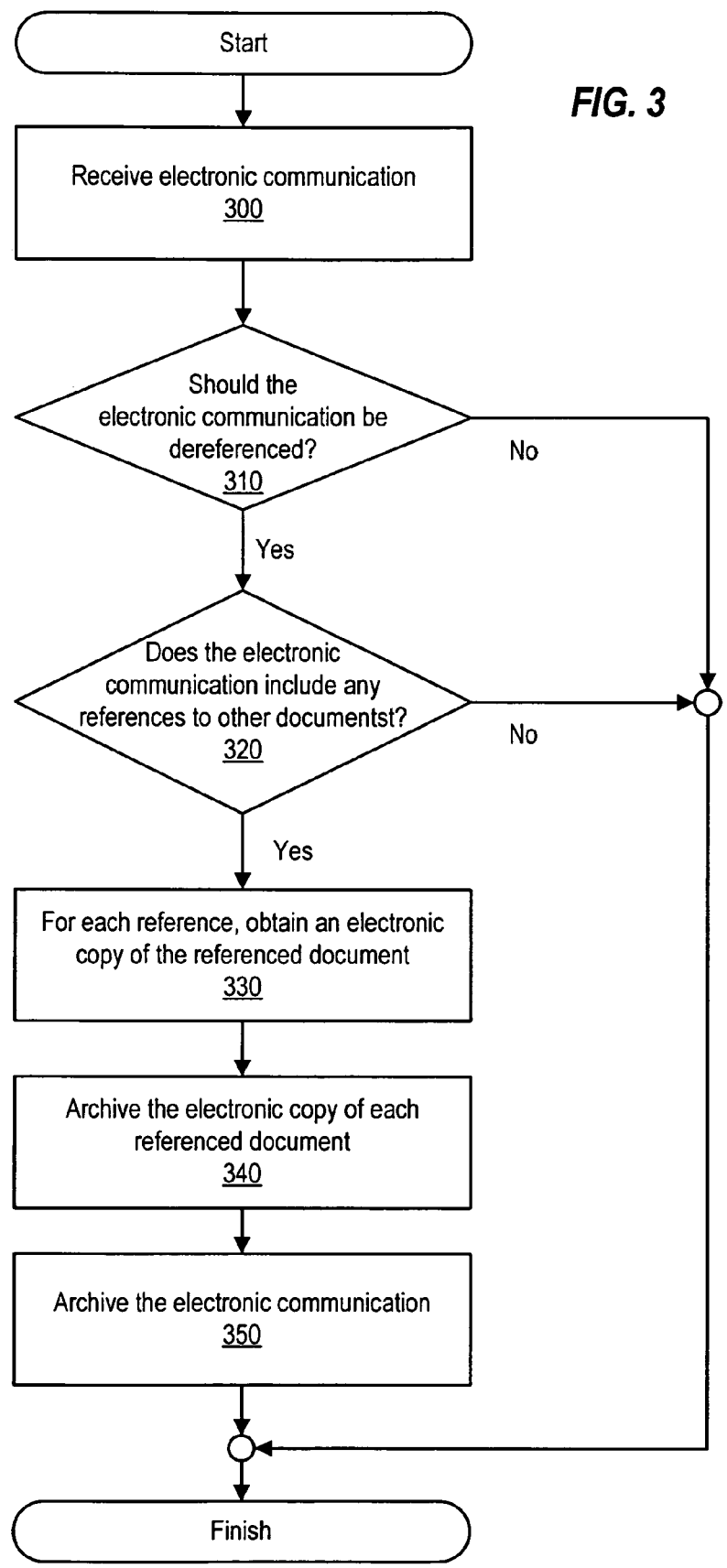
FIG. 3 is a flowchart of a method of dereferencing an electronic communication, according to one embodiment of the present invention.

FIG. 3 is a flowchart of one embodiment of a method of dereferencing an electronic document. At least a portion of this method (e.g., operations 300, 310, 320, and 330) can be performed by a dereferencing module such as dereferencing module 100 of FIGS. 1 and 2.

The method begins at 300, when an electronic communication is received. This electronic communication can be received by an application or device (e.g., a messaging client or server, a network appliance, or an archive server) that incorporates the dereferencing module.

A determination can then be made as to whether the electronic communication should be dereferenced, as shown at 310. This determination can be based upon the characteristics (e.g., size, date of sending and/or reception, sending and/or receiving parties) of the electronic communication and/or the characteristics (e.g., size, file type, network location, and the like) of the reference. The particular characteristics to use can be specified in a set of policies (e.g., these policies can be created by an administrator and maintained in a file).

It is noted that determination 310 can be omitted from some embodiments. For example, in one such embodiment, all electronic communications are dereferenced, without regard to any policies.

If the electronic communication contains any references, as detected at 320, an electric copy of each reference can be obtained, as shown at 330. It is noted that, in some embodiments, operation 320 is also dependent upon a determination as to whether each of the references should be obtained (e.g., based upon the applicable policies, if any).

Obtaining an electronic copy of each document (as shown at 330) referenced by the electronic communication can involve attempting to contact a web server or file server. In some embodiments, if the initial attempt to obtain the document is unsuccessful, operation 330 can be reattempted one or more times.

At 340, the electronic copy of each document is archived and at 350, the electronic communication is archived. These operations can be performed by an archive server. Archiving the electronic communication involves storing the electronic communication on an archive media. Archival can also involve updating a database or other metadata to identify the electronic communication and its location on the archive media as well as updating a search index based upon the electronic communication's contents and/or characteristics.

Archiving an electronic copy of a document can involve storing the copy of the document on an archive media. Archiving can also involve updating an archival database or other metadata to identify the copy of the document as well as the storage locations storing the copy of the document. If appropriate, a search index can also be updated based upon the documents contents and/or characteristics.

It is noted that operations 340 and 350 can be performed at the same time (at least in part) or in a different order than is shown in FIG. 3. For example, the electronic communication can be archived prior to archival of the documents referenced in that electronic communication. Similarly, other operations of FIG. 3 can be performed in different orders and/or omitted.

Other operations can be performed in addition to and/or instead of those operations shown in FIG. 3. For example, as noted above, in some embodiments, the electronic communication can be modified to contain a new reference that identifies the electronic copy or copies obtained by performing operation 330 (e.g., by modifying the electronic communication to include a pointer to a storage location storing the electronic copy) or to contain the electronic copy itself. Alternatively, an archival database can be updated to identify both the electronic communication and any documents referenced by that electronic communication, allowing the copies of the electronic communication and referenced documents in the archive to be correlated with each other.

Figure 4:
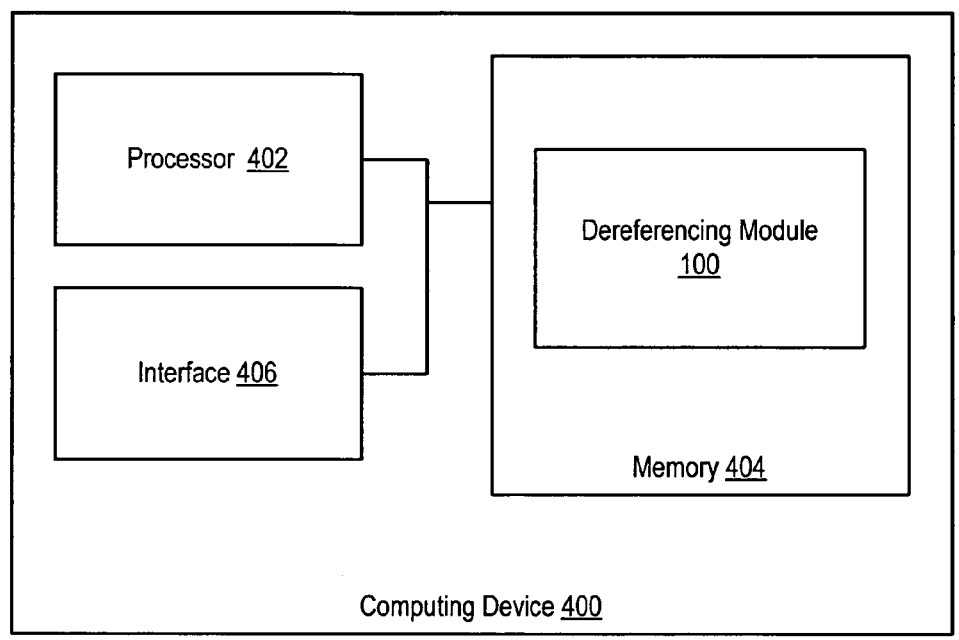
FIG. 4 is a block diagram of a computing device that implements a dereferencing module, according to one embodiment of the present invention.

FIG. 4 is a block diagram of a computing device 400 that implements a dereferencing module. FIG. 4 illustrates how certain elements of dereferencing module 100 can be implemented in software. Computing device 400 can be a personal computer, network appliance, server, personal digital assistant, mobile phone, storage controller (e.g., an array controller, tape drive controller, or hard drive controller), or the like.

As illustrated, computing device 400 includes one or more processors 402 (e.g., microprocessors, Programmable Logic Devices (PLDs), or Application Specific Integrated Circuits (ASICs)) configured to execute program instructions stored in memory 404. Memory 404 can include various types of RAM (Random Access Memory), Read Only Memory (ROM), Flash memory, Micro Electro-Mechanical Systems (MEMS) memory, magnetic core memory, and the like. Memory 404 can include both volatile and non-volatile memory. Computing device 400 also includes one or more interfaces 406. Processor 402, interface 406, and memory 404 are coupled to send and receive data and control signals by a bus or other interconnect.

Interface 406 can include a network interface to various networks and/or interfaces to various peripheral buses. For example, interface 406 can include a network interface that allows dereferencing module 100 to communicate with an archive server (if the dereferencing module 100 is not integrated with the archive server) or a messaging server. Thus, interface 406 can include an interface to a network, such as network 180 of FIG. 1. Interface 406 can also include an interface to one or more storage devices (e.g., archive media 150 of FIG. 1). Thus, dereferencing module 100 can write documents to an archive media via interface 406.

In this example, program instructions and data executable to implement all or part of dereferencing module 100 are stored in memory 404. The program instructions and data implementing dereferencing module 100 can be stored on various computer readable media such as memory 404. In some embodiments, such software is stored on a computer readable medium such as a Compact Disc (CD), Digital Versatile Disc (DVD), hard disk, optical disk, tape device, floppy disk, and the like). In order to be executed by processor 402, the instructions and data can be loaded into memory 404 from the other computer readable medium. The instructions and/or data can also be transferred to computing device 400 for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
 detecting an archival of an electronic communication;
 searching at least a portion of the electronic communication for a reference to a document, wherein
  the document is not included in the electronic communication;
 determining that a copy of the document is not currently being maintained as part of the archival of the electronic communication;
 in response to the determining, automatically obtaining, using a processor, an electronic copy of the document from a location identified by the reference;
 archiving the electronic copy of the document as an archived electronic copy of the document; and
 retrieving the electronic communication and the archived electronic copy of the document at a time when the document is no longer available at the location identified by the reference.
2. The method of claim 1, comprising:
 locally storing the electronic copy of the document.
3. The method of claim 1, wherein
 the electronic communication comprises one of: an electronic document, an email message, and an instant message.
4. The method of claim 1, further comprising:
 searching at least a portion of the electronic copy of the document for a second reference to a second document; and
 automatically obtaining an electronic copy of the second document, in response to detecting the second reference.
5. The method of claim 1, further comprising:
 modifying the electronic communication, wherein
  subsequent to being modified, the electronic communication comprises the electronic copy of the document.
6. The method of claim 1, further comprising:
 modifying the electronic communication, wherein
  subsequent to being modified, the electronic communication comprises a pointer to a storage location storing the electronic copy of the document.
7. The method of claim 1, further comprising:
 accessing a policy prior to searching a particular electronic communication, wherein
  the policy indicates whether the particular electronic communication should be searched for any references to documents.
8. A system comprising:
 a processor; and
 a memory, wherein the memory stores program instructions executable by the processor to:
  detect an archival of an electronic communication;
  search at least a portion of the electronic communication for a reference to a document, wherein
   the document is not included in the electronic communication;
  determine that a copy of the document is not currently being maintained as part of the archival of the electronic communication;
  in response to a determination that the copy of the document is not currently being maintained as part of the archival of the electronic communication, automatically obtain an electronic copy of the document from a location identified by the reference;
  archive the electronic copy of the document as an archived electronic copy of the document; and
  retrieve the electronic communication and the archived electronic copy of the document at a time when the document is no longer available at the location identified by the reference.
9. The system of claim 8, wherein the program instructions are further executable by the processor to:
 locally store the electronic copy of the document.
10. The system of claim 8, wherein the program instructions are further executable by the processor to:
 search at least a portion of the electronic copy of the document for a second reference to a second document; and
 automatically obtain an electronic copy of the second document, in response to a detection of the second reference.
11. The system of claim 8, wherein the program instructions are further executable by the processor to:
 access a policy prior to searching a particular electronic communication, wherein
  the policy indicates whether the particular electronic communication should be searched for any references to documents.
12. A non-transitory computer readable storage medium comprising program instructions executable to:
 detect an archival of an electronic communication;
 search at least a portion of the electronic communication for a reference to a document, wherein the document is not included in the electronic communication;

determine that a copy of the document is not currently being maintained as part of the archival of the electronic communication;

in response to a determination that the copy of the document is not currently being maintained as part of the archival of the electronic communication, automatically obtain an electronic copy of the document from a location identified by the reference;

archive the electronic copy of the document as an archived electronic copy of the document; and retrieve the electronic communication and the archived electronic copy of the document at a time when the document is no longer available at the location identified by the reference.

13. The non-transitory computer readable medium of claim 12, wherein the program instructions are further executable to:

locally store the electronic copy of the document.

14. The non-transitory computer readable medium of claim 12, wherein the program instructions are further executable to:

search at least a portion of the electronic copy of the document for a second reference to a second document; and automatically obtain an electronic copy of the second document, in response to a detection of the second reference.

15. The non-transitory computer readable medium of claim 12, wherein the program instructions are further executable to:

modify the electronic communication, wherein
  subsequent to being modified, the electronic communication comprises the electronic copy of the document.

16. The non-transitory computer readable medium of claim 12, wherein the program instructions are further executable to:

modify the electronic communication, wherein
  subsequent to being modified, the electronic communication comprises a pointer to a storage location storing the electronic copy of the document.

17. The non-transitory computer readable medium of claim 12, wherein the program instructions are further executable to:

access a policy prior to searching a particular electronic communication, wherein
  the policy indicates whether the particular electronic communication should be searched for any references to documents.

18. A system comprising:

a processor configured for detecting an archival of an electronic communication;

means for searching at least a portion of the electronic communication for a reference to a document, wherein the document is not included in the electronic communication;

means for determining that a copy of the document is not currently being maintained as part of the archival of the electronic communication;

means for, in response to determining that the copy of the document is not currently being maintained as part of the archival of the electronic communication, automatically obtaining an electronic copy of the document from a location identified by the reference;

means for archiving the electronic copy of the document as an archived electronic copy of the document; and means for retrieving the electronic communication and the archived electronic copy of the document at a time when the document is no longer available at the location identified by the reference.

19. The system of claim 18, further comprising:

means for accessing a policy prior to searching a particular electronic communication, wherein
  the policy indicates whether the particular electronic communication should be searched for any references to documents.

20. The system of claim 18, further comprising:

means for locally storing the electronic copy of the document.

\* \* \* \* \*